(12) United States Patent
Zheng et al.

(10) Patent No.: US 9,460,272 B2
(45) Date of Patent: Oct. 4, 2016

(54) METHOD AND APPARATUS FOR GROUP LICENSING OF DEVICE FEATURES

(71) Applicant: General Instrument Corporation, Horsham, PA (US)

(72) Inventors: Jinsong Zheng, San Diego, CA (US); Tat Keung Chan, San Diego, CA (US); David B Prickett, San Diego, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 87 days.

(21) Appl. No.: 14/212,033

(22) Filed: Mar. 14, 2014

(65) Prior Publication Data
US 2015/0013015 A1    Jan. 8, 2015

Related U.S. Application Data

(60) Provisional application No. 61/786,156, filed on Mar. 14, 2013.

(51) Int. Cl.
G06F 21/00     (2013.01)
G06F 21/10     (2013.01)
H04L 29/06     (2006.01)

(52) U.S. Cl.
CPC ............ *G06F 21/105* (2013.01); *H04L 63/10* (2013.01)

(58) Field of Classification Search
CPC .............................. G06F 21/105; H04L 63/10
USPC .......................................................... 726/27
See application file for complete search history.

(56) References Cited

U.S. PATENT DOCUMENTS

| 2010/0235921 A1* | 9/2010 | Foster ............... G06Q 20/3829 726/26 |
| 2011/0196793 A1* | 8/2011 | Zheng .................... G06Q 30/00 705/50 |
| 2012/0204224 A1* | 8/2012 | Wang ................. H04L 67/2819 726/3 |

* cited by examiner

*Primary Examiner* — Narciso Victoria
(74) *Attorney, Agent, or Firm* — Thomas A. Ward

(57) ABSTRACT

Methods and systems for group licensing of homogeneous and heterogeneous devices features are disclosed. Licensing servers manage the generation and distribution of licenses to devices, and enforce validation rules that prevent granting devices licenses that do not comply with group licensing limits.

12 Claims, 13 Drawing Sheets

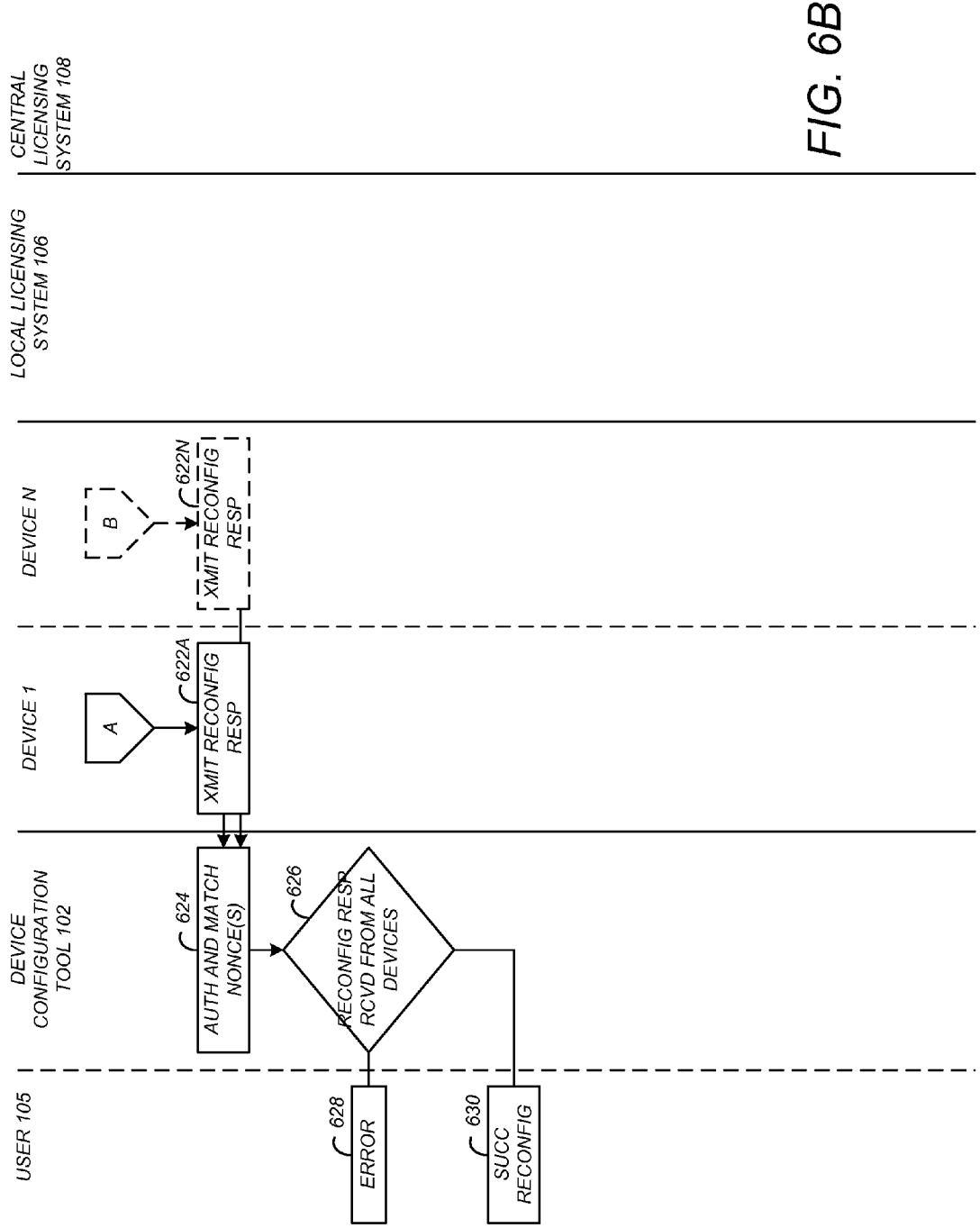

METHOD AND APPARATUS FOR GROUP LICENSING OF DEVICE FEATURES

CROSS-REFERENCE TO RELATED APPLICATIONS

This application claims benefit of U.S. Provisional Patent Application No. 61/786,156, entitled "FEATURE LICENSING FOR A GROUP OF DEVICES," by Jinsong Zheng, Tat Keung Chan, and David B. Prickett, filed Mar. 14, 2013, which application is hereby incorporated by reference herein.

BACKGROUND OF THE INVENTION

1. Field of the Invention

The present invention relates to systems and methods for managing device licenses, and in particular to a system and method for managing licenses of device groups.

2. Description of the Related Art

Feature licensing has been increasingly used to control the internal functions of electronic devices after they are purchased by customers. Feature licensing allows flexibility for customers to acquire devices with less upfront cost and pay later for additional functions and capacity. A feature license for a specific device controls which internal functions of that device are enabled. When an internal function has a range of capacity, a feature license can also control the level of capacity at which the function should perform. For example, a video encoder may support high efficiency video coding (HEVC) and a maximum of 64 video streams. When the encoder has a feature license that does not enable HEVC and limits the number of video streams to 16, the encoder does not perform HEVC and can only encode up to 16 video streams. However, when the encoder has a different feature license that enables HEVC and limits the number of video streams to 48, the encoder will do HEVC encoding on up to 48 video streams. To make sure that a feature license can only be used by a specific device, the feature license is cryptographically bound to the unique identification of the device.

While feature licensing targeting individual devices is effective in controlling device functions and capacity post device purchase, it does not readily extend to a group of devices. In many application scenarios, multiple devices work together as a group to perform a common function or support capacity larger than a single device can provide. For example, in a cable television headend, different devices for video reception, processing and distribution may all handle high-definition (HD) video. Meanwhile, multiple video distribution devices work together to serve a community whose population exceeds the capacity of a single video distribution device. For such a group of devices, whether of the same kind or different kinds, function and capacity control must be at the group level, instead of at the device level.

SUMMARY OF THE INVENTION

To address the requirements described above, the present invention discloses a method and apparatus for licensing features for one or more groups selected from a plurality of devices. In one embodiment, the method comprises the steps of receiving a first group license request for a group license associated with a first group of the plurality of devices, the first group comprising one or more of the plurality of devices, determining if the first group license request complies with a validation rule, wherein the validation rule requires that the first group license request include a device ID of at least one of the plurality of devices, if the first group license request complies with the validation rule, generating a first group license according to the first group licensing request, and securely transmitting the generated first group license to each device of the first group of devices, wherein each device of the one or more devices in the first group devices, determines if the device ID of the device is included in the member list and if so, stores the group license on each device.

In another embodiment, the method comprises receiving, in a local licensor, a first group license request for a group license associated with a first group of the plurality of devices, the first group comprising one or more of the plurality of devices, receiving, in the local licensor, a device ID for each of the devices in the first group of devices, generating a first group license request, transmitting the first group license request to a central licensor, receiving a first group license from the central licensor only if, as determined by the central licensor, the first group license request complies with a validation rule, wherein the validation rule requires that the first group license request includes at a device ID of at least one of the plurality of devices and that none of the devices in the first group of devices are in a current device group, storing the group license in the local licensor, receiving a member license request from at least one device in the first group of devices, determining, in the local licensor, whether the at least one device transmitting the member license request is a member of the first group of devices, if the at least one device transmitting the member license request is a member of the first group of devices, generating a member license, the member license comprising the first group license, and securely transmitting the stored group license to the at least one device, for storage on the at least one device.

BRIEF DESCRIPTION OF THE DRAWINGS

Referring now to the drawings in which like reference numbers represent corresponding parts throughout:

FIGS. 6A and 6B are diagrams illustrating an exemplary process that can be used to change the configuration of one of the devices in the second group licensing paradigm;

DETAILED DESCRIPTION OF PREFERRED EMBODIMENTS

Figure 1A:
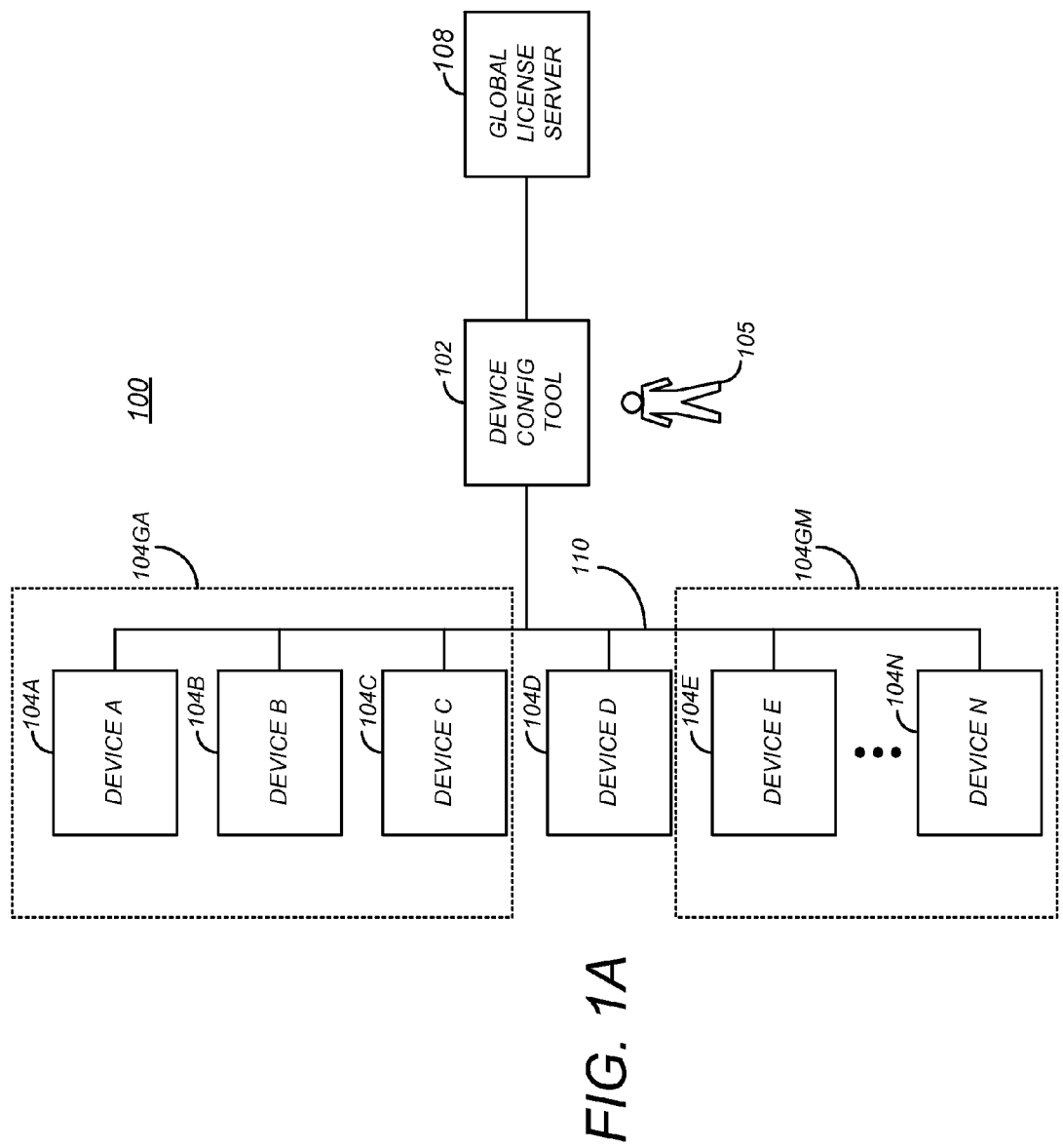
FIGS. 1A and 1B are diagrams illustrating exemplary group licensing systems.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Feature licensing for a group of devices poses several challenges:

First, in order for a feature license to be only used by a group of devices, there must be a strong binding between the feature license and the device group. A feature license bound to one device group should not be valid for a different device group. The binding between a feature license and its target device group should not be easily modifiable. This problem is referred to as the group binding problem.

Second, a group feature license controls which Boolean type features may be enabled and sets the upper limit of integer type features for the entire device group. If a particular Boolean type feature is not included in the group license, no device in the group can have that feature enabled. The sum of the capacities of an integer type feature configured on all the devices in the group cannot be over the value of the feature in the group license. To enforce a group license is to check whether these two conditions are satisfied, and if not, the device that makes any of the two conditions false must not be allowed to function as configured. This problem is referred to as the group license enforcement problem.

Third, as devices may be moved into and out of a group, there must be a way to modify group membership while maintaining the strong binding between the feature license and the device group. For example, if there is a device group consisting of Device A and Device B, when Device C is added to the group, there must be a way for the feature license to bind to the device group now consisting of Device A, Device B and Device C. And if subsequently Device B is taken out of the group, the feature license must be bound to the device group now consisting of Device A and Device C. This problem is referred to as the group update problem.

Finally, a feature license is a file that can be duplicated. If a device group is split into two or more smaller groups, each with a copy of the original feature license, and if new devices are allowed to be added to the smaller groups, the result would be several separate device groups, each potentially capable of functioning at the full capacity of the original license. For example, a video distribution device group, Group G, may consist of Device A, Device B, Device C and Device D and may have a group license that limit the number of output video streams to 10,000. Suppose Group G is split into Group G1 consisting of Device A and Device B, and Group G2 consisting of Device C and Device D. Meanwhile, each of Group G1 and Group G2 has a separate copy of the original feature license. If new Device E and Device F are added to Group G1, and new Device G and Device H are added to Group G2, we end up with two device groups each of which can support up to 10,000 video streams, and together capable of supporting up to 20,000 video streams. A customer would have gained an additional 10,000 stream capacity without paying for it. This problem is referred to as the group split problem.

DEFINITIONS

Device Feature: An internal function of an electronic device.

Feature Descriptor: A data structure that contains a feature ID and a feature type (either Boolean or integer), and a feature value if the feature type is integer. The feature value of an integer type feature is the quantity of the feature.

Feature Specification: A list of feature descriptors, each for a different feature.

Feature License: A file that contains, among other things, the identification of a license target, feature specification, a monotonously increasing sequence number and a signature that can only be generated by a central licensing system.

Device Group: A group devices that work together to provide certain functionality as a whole. A device group has a globally unique group ID.

Group Feature License (or Group License): A feature license that targets a device group and contains the feature specification for the entire group.

Feature Configuration: The settings of device features of a device. For a Boolean type feature, the setting is either on or off. For an Integer type feature, the setting is an integer indicating the capacity of the feature.

Heartbeat Cycle: A period of time (which may be aperiodic) within with a device sends out a heartbeat and receives heartbeats from other devices.

Configuration Lease: An authorization for a limited period of time for a feature configuration to be applied to a device.

System Configuration

FIG. 1A is a diagram illustrating a first embodiments of a group licensing system 100. The group licensing system 100 comprises a device configuration tool 102, communicatively coupled to a central license system 108 and one or more devices 104A-104C to be licensed. The device configuration tool can be used to manage the licensing of devices 104A-104N (hereinafter alternatively referred to as device(s) 104) in groups 104GA-104GM (hereinafter referred to as device group(s) 104G), and can typically implemented as an application executing on a computer or similar device as discussed further below.

Figure 1B:
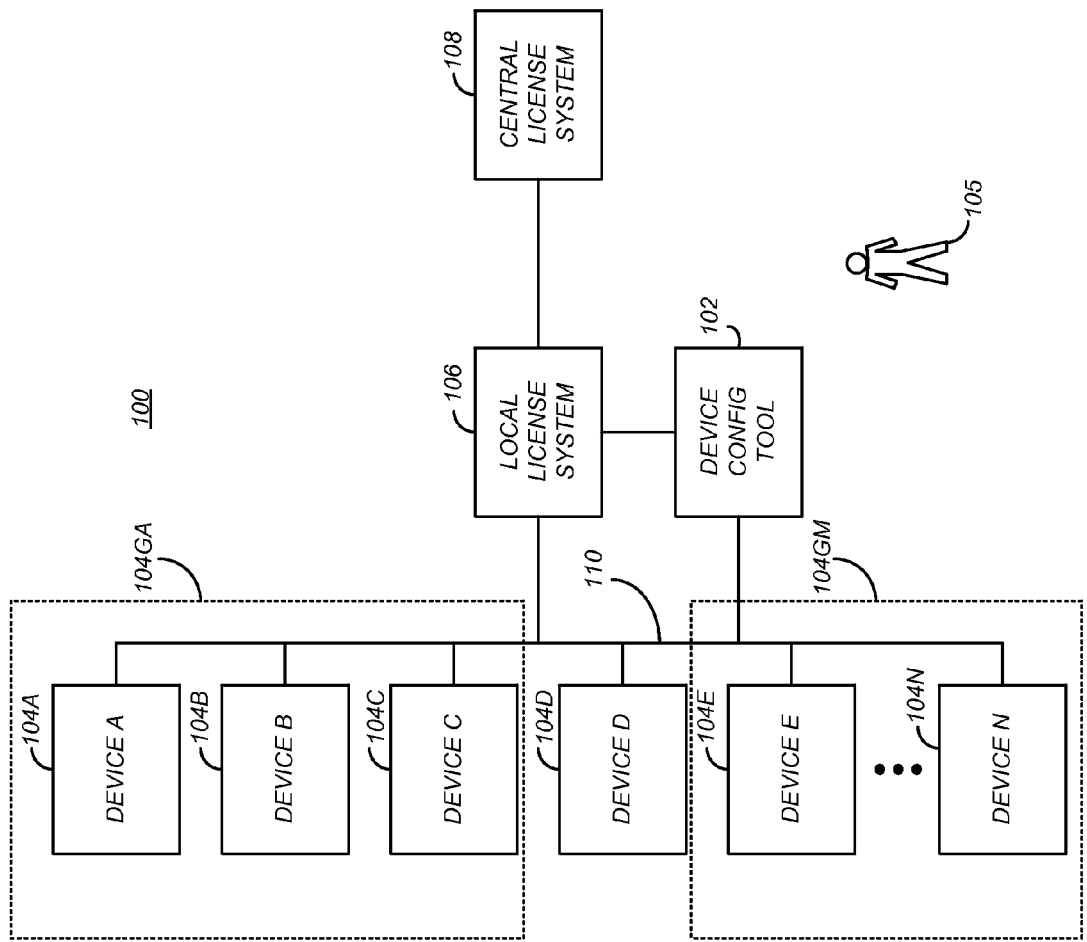

FIG. 1B is a diagram illustrating a second embodiment of a group licensing system 100. This embodiment also comprises a local license server 106 interposed between the global license server 108 and device configuration tool 106 as well as between the central licensing server 108 and devices 104GA-104GM.

Three potential solutions to the aforementioned problems are described below. Each solution can solve all three problems and can be implemented independently.

Solution 1

Solution 1 utilizes the central licensing system 108, a device configuration tool 102, and a group license format that binds a group license to both a globally unique group ID and the device IDs of each device 104 in a group 104G. Such a group licensing system is illustrated in FIG. 1A.

In this embodiment, the central licensing system 108 is responsible for group license generation and for validating group membership changes. The device configuration tool 102 is used for creating license requests and configuring features on one or more devices. The group license is stored on each device in the group. License enforcement is performed by every device 104 in the group 104G.

Solution 1 is most useful for applications where the presence of a local licensing server 106 is not feasible, due to financial, technical or legal reasons. A pre-requisite for Solution 1 is that the devices 104 in a group 104G must be interconnected with each other (e.g. via a device network 110) for licensing purposes. The network 110 for licensing purposes must be highly reliable, support at least one multicast protocol, and may be separate from other networks (not illustrated) that the devices are connected to.

New Group Initiation

Figure 2:
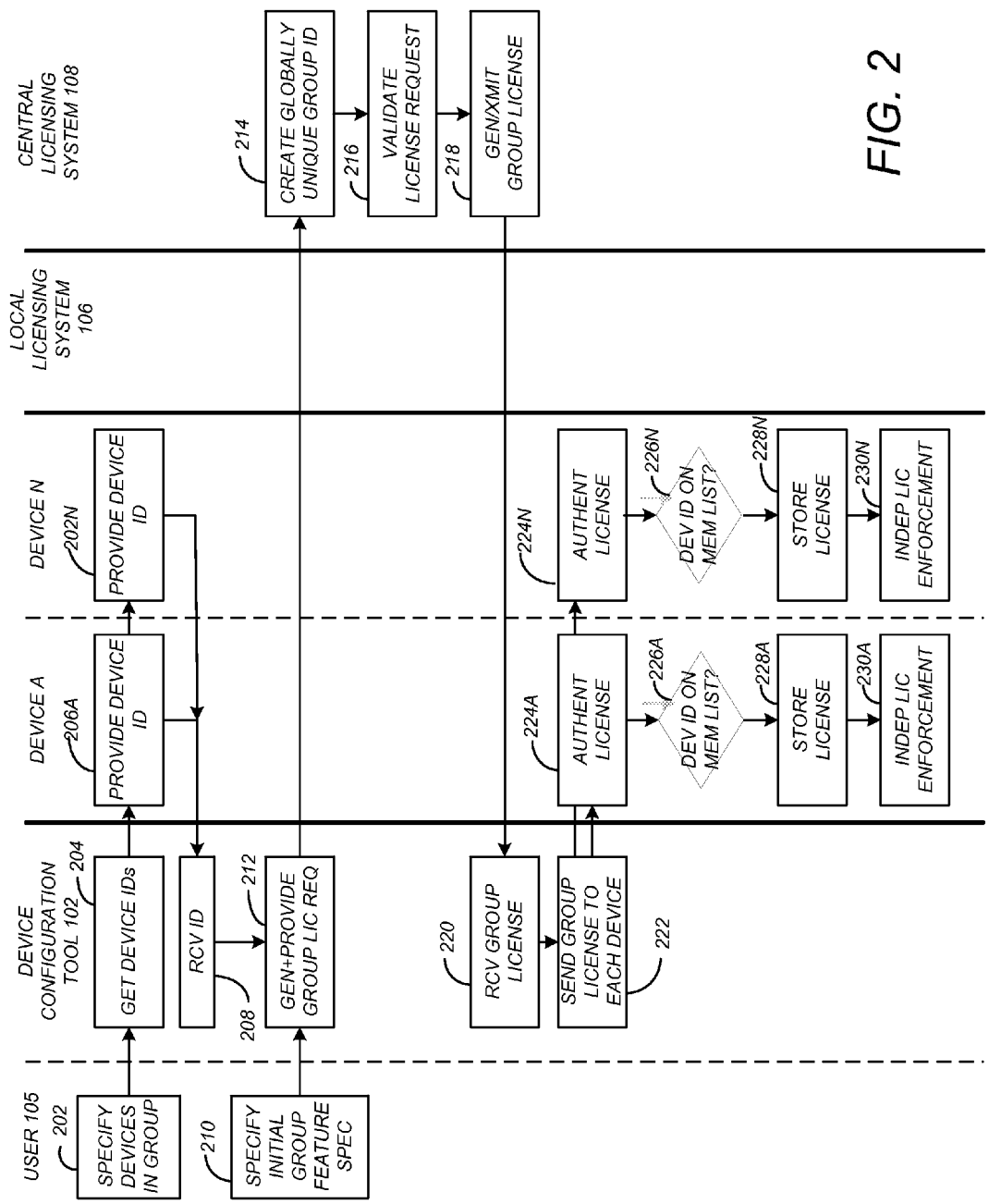
FIG. 2 is a diagram illustrating one embodiment of how a new group is initiated in the first group licensing paradigm.

FIG. 2 is a diagram illustrating one embodiment of how a new group is initiated in the first group licensing solution paradigm. When a new device group 104G needs to be defined), the user 105 uses the device configuration tool 102 to specify which devices 104 should be in the new group 104G, as shown in block 202. The device configuration tool 102 then connects to each device 104 that is a member of the newly defined group 104G defined by the user 105 and transmits a message to each of the devices 104 in the group 104G to obtain it's device ID. This is illustrated in block 204. Each device 104 in the new group 104G by transmitting its device ID to the device configuration tool 102, which are received by the device configuration tool, as shown in blocks 206, 206N and 208.

As shown in block 210, the user 105 then uses the device configuration tool 102 to specify an initial feature specification for the new group of devices 104G. In one embodiment, the initial feature specification includes requested features for the first group of devices, and can comprise of a list of feature descriptors, each for a different feature.

In block 212, and the device configuration tool 102 generates a new group license request that contains the member device IDs (e.g. the device ID for each of the devices 104 in the user-specified first group of devices 104G) and the initial feature specification for the user-defined group of devices 104.

The group license request is sent, whether through an automated interface or a user interface, to the central licensing system 108. The central licensing system 108 receives the first group license request and creates a globally unique group ID for the first device group 104G, as shown in block 214. The central licensing system then determines if the first group license request complies with a validation rule, as shown in block 216. In one embodiment, the validation rule applied in the illustrated initiation process requires that the first group license request includes a device ID of at least one device 104 (e.g. a group license is not for an empty group) and that none of the devices in the first group request license are in another device group on record in the central licensing system 108. If the group license request comprise with the validation rule(s) the central licensing system generates a first group license according to the first group licensing request and transmits the generated first group license, as shown in block 218.

In one embodiment, the first group license comprises a group ID, a member list comprising the device ID for each of the devices in the first group, a new sequence number, and a first group license feature specification that comprises the requested first group features. For security purposes, the entire group license may be signed according to a private key accessible only by the central licensing system 108 before transmission. In block 220, the group license is received by the device configuration tool 102. The group license may be transceived from the central licensing system 108 to the device configuration tool 102 via an automated interface or by the user command 105.

In block 222, the user 105 uses the device configuration tool 102 to transmit the received new group license to each device 104 in the in the group of devices 104G. Each device 104 may then authenticate the signature associated the license and if the authentication is successful, stores the license in the device 104. Being supplied with a group license, each device 104 then independently enforces the group license independently. As shown in blocks 226A and 226N, each device 104A, 104N in the group of devices 104G determines if the device ID of that device 104 is included in the member list received in the group license. If so, the group license is stored in the device 104. The group license is then enforced independently by each device as shown in blocks 230A and 230N, and as further described in "Group License Enforcement" below.

The use of a group ID makes it possible for a device 104 to identify which group 104G it belongs to, which is important for group license enforcement in an environment where multiple groups of devices 104 may be connected to each other (for example, device groups 104G1 and 104GM as shown in FIG. 1A. The inclusion of a group ID and a list of member device IDs in a group license binds the group license to a device group 104G. The signature in a device group's license ensures that the list of member device IDs in the license cannot be modified without detection, thus making the binding between a device group's license and the device group 104G tamper-proof. Further, the monotonously increasing sequence number generated by the central licensing system 108 that is included in the group license gives a device 104 the capability of preventing a license from being replaced with an older license.

Group Membership Update

Figure 3:
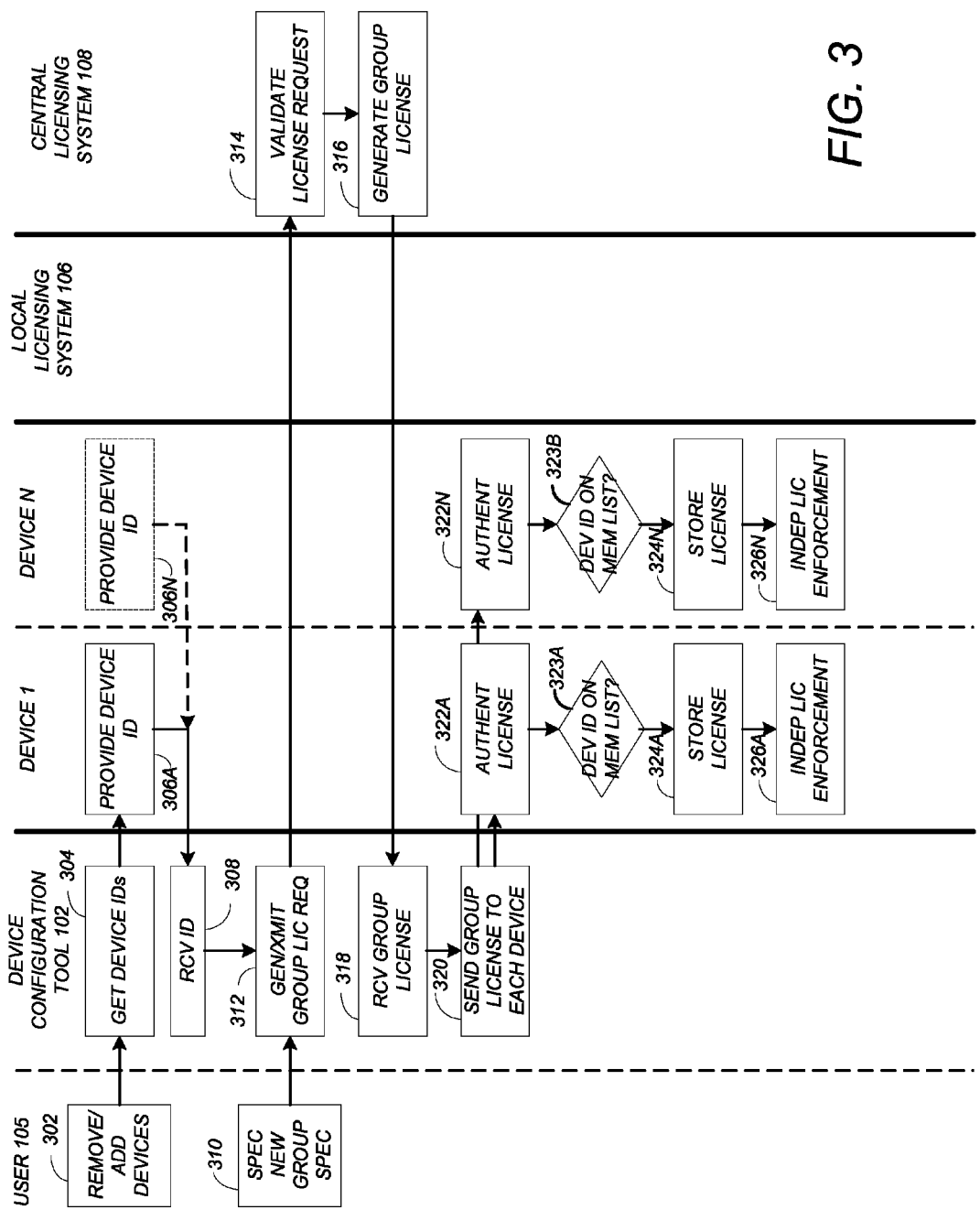
FIG. 3 is a diagram illustrating exemplary process steps by which the user can make changes to the membership of a group of devices in the first group licensing paradigm.

FIG. 3 is a diagram illustrating exemplary process steps by which the user 105 can make changes to the membership of a group of devices 104G. Such changes may be required if the user has removed or added devices, as shown in block 302. When any change to the membership in a group of devices 104G (group membership) is to be made because of adding or removing devices, the user 105 uses the device configuration tool 102 to collect a new list of device IDs for the devices 104 in the network 110, as shown in blocks 302-308.

The user 105 then specifies the member devices 104 of the new group, and may optionally specify a new feature specification for the new group, as shown in block 310. This information is provided to the device configuration tool 102, which generates a second (new) group license request that contains the group ID previously received from the central licensing system, and the new list of device IDs defining the new group members, as well as the (optional) new feature specification, as shown in blocks 310 and 312.

The second group licensing request is transmitted to the central licensing system 108. This can be initiated automatically or manually by user 105 command using the device configuration tool 102. The central licensing system 108 validates the request to determine if the validation rule is complied with, as shown in block 314. In one embodiment, the validation rule enforced by the central licensing system 108 includes (1) a non-empty group rule, which stipulates that a group cannot be empty, and (2) a unidirectional membership change rule, which stipulates that devices can either be added to a group or removed from a group but not at the same time.

For example, suppose group G has Device A and Device B. The non-empty group rule will prohibit the removal of all members from the group and making the group empty. Meanwhile, the unidirectional membership change rule will prohibit the addition of Device C and the removal of Device B at the same time and making the group consist of Device A and Device C. However, Device C can be added to the group to make it consist of Device A, Device B, and Device C; or Device B can be removed from the group to make it consist of Device A.

The non-empty group rule and the unidirectional membership change rule together ensure that a device group cannot be split into two independent and fully functioning groups, solving the group split problem.

If the second (new) license request complies with the validation rule, the central licensing system 108 generates a new group license as shown in block 316. The new group license includes the new list of device IDs that are members of the newly defined group 104G and the feature specification contained in the group license request received from the device configuration tool 102.

The new group license is provided to each device 104 in the new group 104G via the device configuration tool 102. Each device 104 that remains in the group 104G authenticates the new group license, as shown in blocks 322A and 322N and replaces its currently stored group license with the new group license if the group license complies with the following validation rule: (1) the group ID in the newly received group license is the same as that in the currently stored license (2) the sequence number in the newly received license is higher than that in the currently stored license; and (3) the device's ID is on the list of device IDs in the newly received group license. The validation rule can be performed by the device configuration tool 102, the devices 104, or can be allocated between the device configuration tool and the devices 104. This is illustrated in blocks 323A-326A and 323N-323B.

Group License Enforcement

Figure 4:
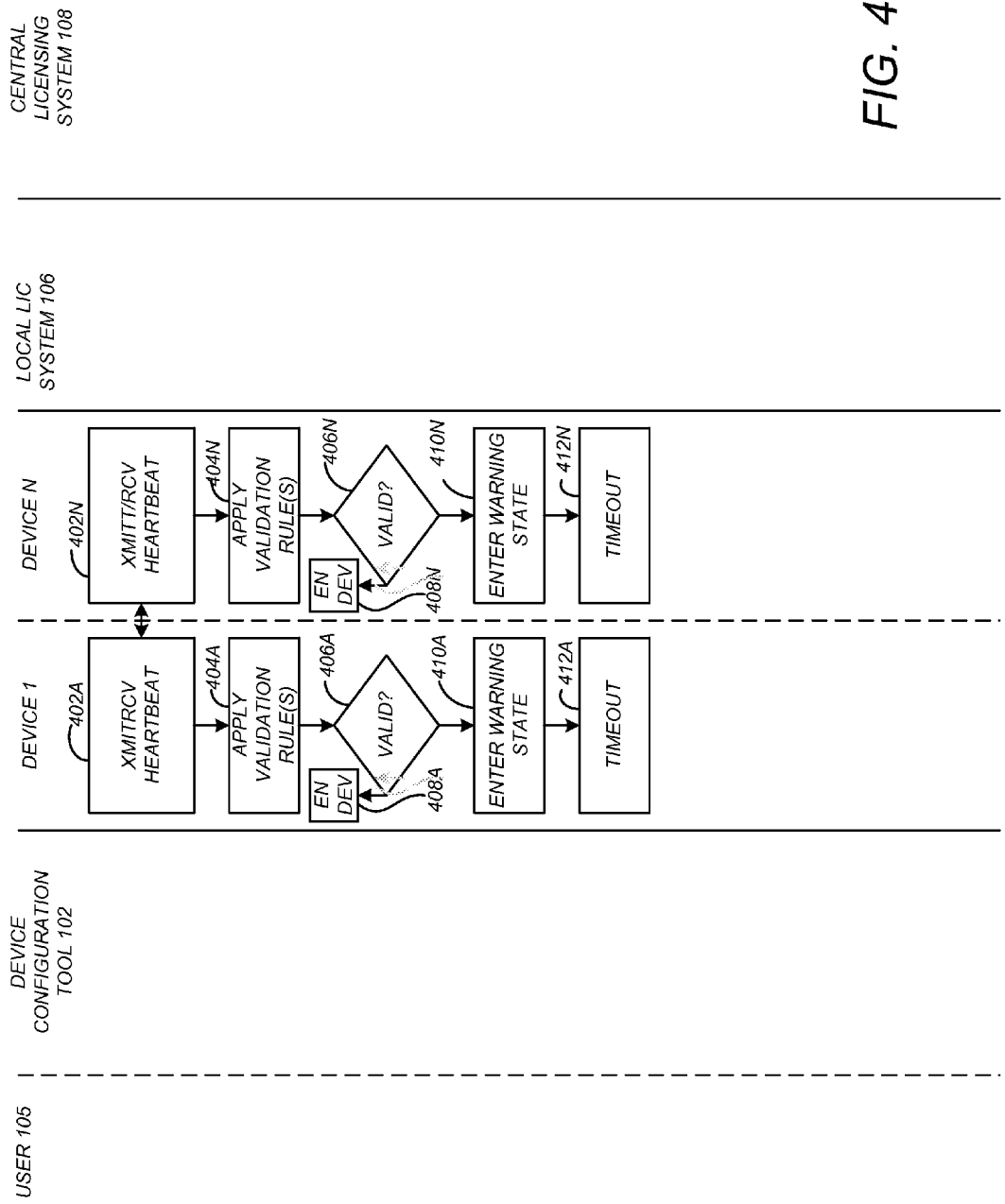
FIG. 4 is a diagram illustrating exemplary operations for enforcing group licenses in the first group licensing paradigm.

FIG. 4 is a diagram illustrating exemplary operations for enforcing group licenses. In order for the group license to be enforced, two checks are be performed: (1) a membership check to determine that the list of devices in the group matches the list of devices in the group license, and (2) a feature specification check to assure that (a) no Boolean type feature is enabled on any of the devices 104 in the group 104G unless the feature is included in the group license and (b) that the sum of the capacity of an integer type feature configured on all the devices in the group must not exceed the value of the feature in the group license. Since any one device 104 may be taken out of a group 104G, each device 104 must carry out the same enforcement tasks, including (1) Periodically broadcasting a heartbeat containing the ID of the device, the group ID in its license, and the feature configuration to other devices 104 in the network 110, and receiving heartbeats from other devices that contain the same group ID as that in its license. This is illustrated in blocks 402A and 402N. At the end of the heartbeat cycle, each device 104 applies the validation rules describe above, including the membership check and the feature specification check, as shown in blocks 404A and 404N. If the validation rules are complied with, the device is enabled, as shown in blocks 408A and 408N. In this context, device enablement may comprise activating all features of the device, or enabling those features whose configuration complies with the license, while disabling those features whose configuration does not comply with the license.

If the validation rule is not complied with (either of the membership and feature specification checks fails), the device 104 enters into a warning state as shown in blocks 410A and 410N. A device 104 in the warning state still functions as currently configured, however, the operator of devices 104 is made aware of the warning state. If a device 104 remains in the warning state for a certain number of heartbeat cycles, the device 104 goes through a sequence of steps to eventually cease to function meaningfully. The sequence is aborted if the device 104 exits from the warning state before the sequence is completed. The device 104 exits from the warning state when the user modifies its feature configuration such that the new feature configuration, combined with the feature configurations of all the other devices in the same group, complies with the group license. These operations are depicted in blocks 412A and 412N of FIG. 4.

Solution 2

Solution 2 involves a group licensing system as depicted in FIG. 1B, including the central licensing system 108, a device configuration tool 102, a local license system 106 or server, and a group license format that is the same as in Solution 1. The central licensing system 108 is responsible for group license generation and validating group membership changes. The device configuration tool 102 is used for configuring the devices 104 in a group 104G while enforcing the group license. The local license server 106 is used to manage group licenses and serves as the anchor of a device group 104G to which the devices 104 in the group 104G must remain in communication at all times. The local license server 106 is typically configured to be highly available and on a highly dependable network to which the devices 104 are connected.

Solution 2 is most appropriate for application scenarios where the features of multiple devices 104 of the same kind need to be licensed together as a group 104G, and the presence of a local license server 106 is financially, technically and legally acceptable. Because the devices 104 in the group 104A are homogeneous (e.g. of the same kind), one device configuration tool 102 can be used to configure all of them and enforce the group license.

New Group Initiation

Figure 5:
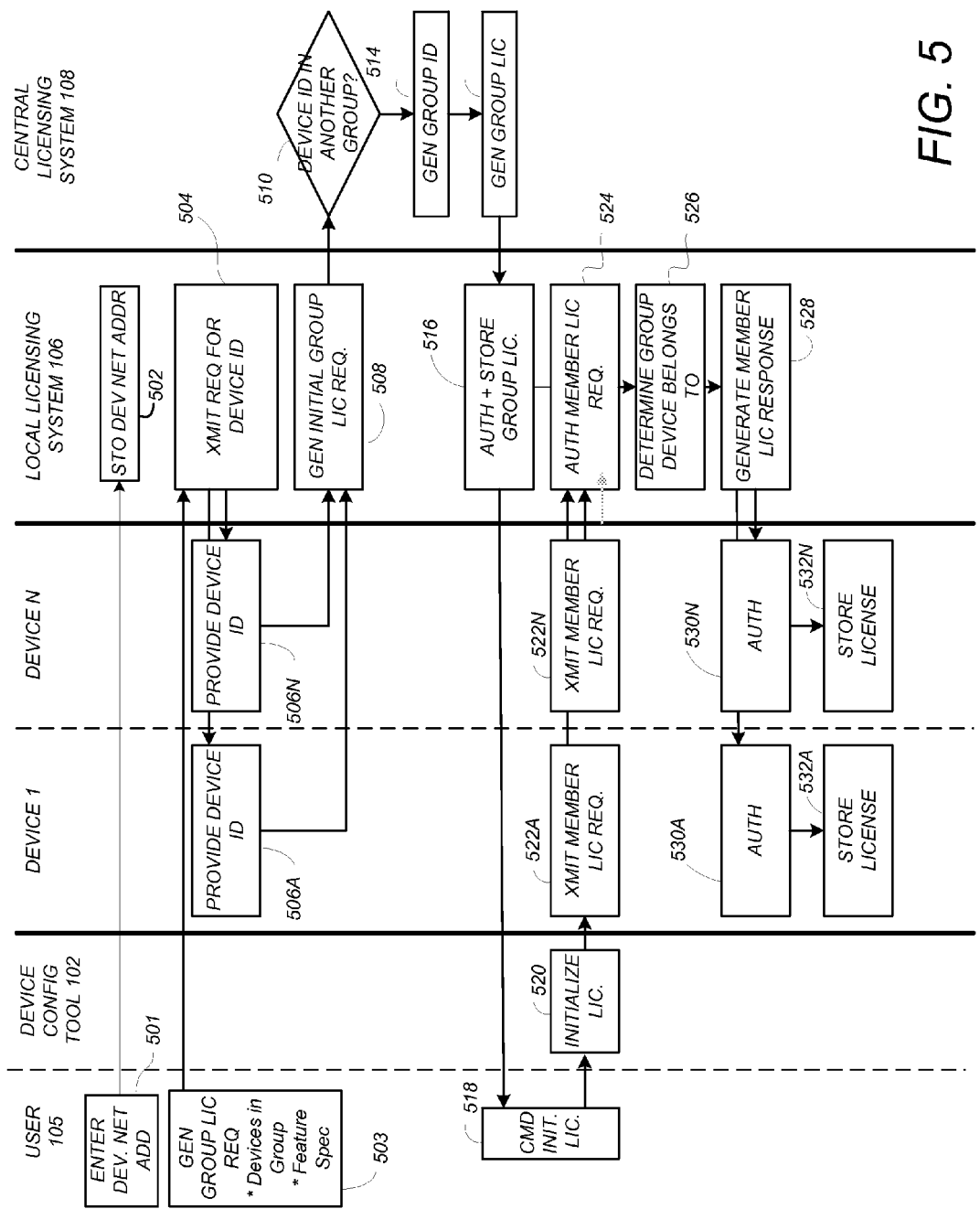
FIG. 5 is a diagram presenting exemplary operations that can be used to initiate a new group of devices 104 according to a second group licensing paradigm.

FIG. 5 is a diagram presenting exemplary operations that can be used to initiate a new group of devices 104 according to Solution 2. When a new device group 104G needs to be created, a user 105 provides the network address of any new devices on the network 110 to the local license server 106, where the network address is stored, as shown in blocks 501 and 502. The local license server 106 creates a device ID request for each selected address and sends it to the targeted address, as shown in block 504. A device ID request includes (1) a nonce, and (2) a signature over the entire request signed by a private key only accessible by the local license server. A nonce is an arbitrary number used only once in a cryptographic communication. It is often a random or pseudo-random number issued in an authentication protocol to ensure that old communications cannot be reused in replay attacks. A nonce is used to give 'originality' to the message, where a nonce is used once and only once.

In blocks 506A and 506N, all devices 104 to be included in the new group 104G reply with a device ID response, which includes (1) the device ID associated with the device 104, (2) the nonce in the device ID request sent to the device, and (3) a signature over the entire response signed by a private key only accessible by the device 104.

After the local license server 106 receives the device ID of all the devices 104 to be included in the new group 104G, it creates an initial group license request as shown in block 508. The initial group license request comprises (1) the device IDs associated with the devices 104 to be in the new group 104G (2) the feature specification for the new group (as obtained from the device configuration tool 102); and (3) signature over the entire request signed by a private key only accessible by the local license server 106.

The group license request is transmitted, automatically or manually, to the central licensing system 108. The central licensing system 108, after checking that the device IDs in the request are not already in another device group 104B and performing any other required validations (e.g. checking whether feature specification is valid and device IDs are in the correct format), creates a globally unique group ID and generates a group license, as shown in blocks 510-514. The group license comprises (1) the group ID, (2) the device IDs of the devices 104 that are members of the group 104G, (3) a new sequence number, (4) the requested feature specification, and (5) a signature over the entire new group license signed by a private key accessible only by the central licensing system 108.

The group ID in the group license binds the license to the group, allows the local license server 106 to serve multiple device groups (e.g. group 104GA and 104GM). The member device IDs included in the group license allows the validation of the membership of a device 104 in the group 104G, while the signature in the group license makes it tamper-proof. The sequence number is used by a device 104 to determine if a license is newer than and should replace the one currently stored by the device 104.

The new group license is provided to the local license server 106, which authenticates the signature in the group license and locally stores the group license, as shown in block 516. After the local license server 106 has stored the first group license for the new group, the user 105 may use the device configuration tool 102 to issue a command instructing the devices in the group to do license initialization, as shown in blocks 518 and 520. The device configuration tool 102 transmits the request to the devices 104 that are members of the new group 104, and each such device 104 in the group sends a member license request to the local license server 106, as shown in blocks 522A and 522N. The member license request comprises (1) the ID of the device 104 sending the request, (2) a nonce (3) and a signature over the entire request signed by a private key only accessible by the device 104 sending the request.

When the local license server 106 receives the member license request from each device 104, it authenticates the signature, determines the group 104G the device 104 belongs to, as shown in block 526. The local license server 106 then returns a member license response, which comprises (1) the group license obtained from the central licensing system 108, (2) the nonce in the member license request; and (3) a signature over the entire response signed by a private key only accessible by the local license server 106. This is illustrated in block 528.

If the local license server 106 cannot find the device 104 in any of the group licenses it holds, it responds with an error message, which is displayed to the user 105 using the device configuration tool 102. The device 104 can not function without a group license nor will it allow a configuration change.

When the requesting device 104 receives the member license response, it authenticates the signature, matches the nonce in the request and response, and stores the group license. At this point, the group initialization is finished and the devices 104 in the group 104G can be configured by the device configuration tool 102, which also enforces the group license, as described further below.

Group License Enforcement

Group license enforcement is performed every time the configuration of any device configuration is changed. It is also automatically performed on a periodic or aperiodic basis.

Enforcement at Configuration Time

Figure 6A:
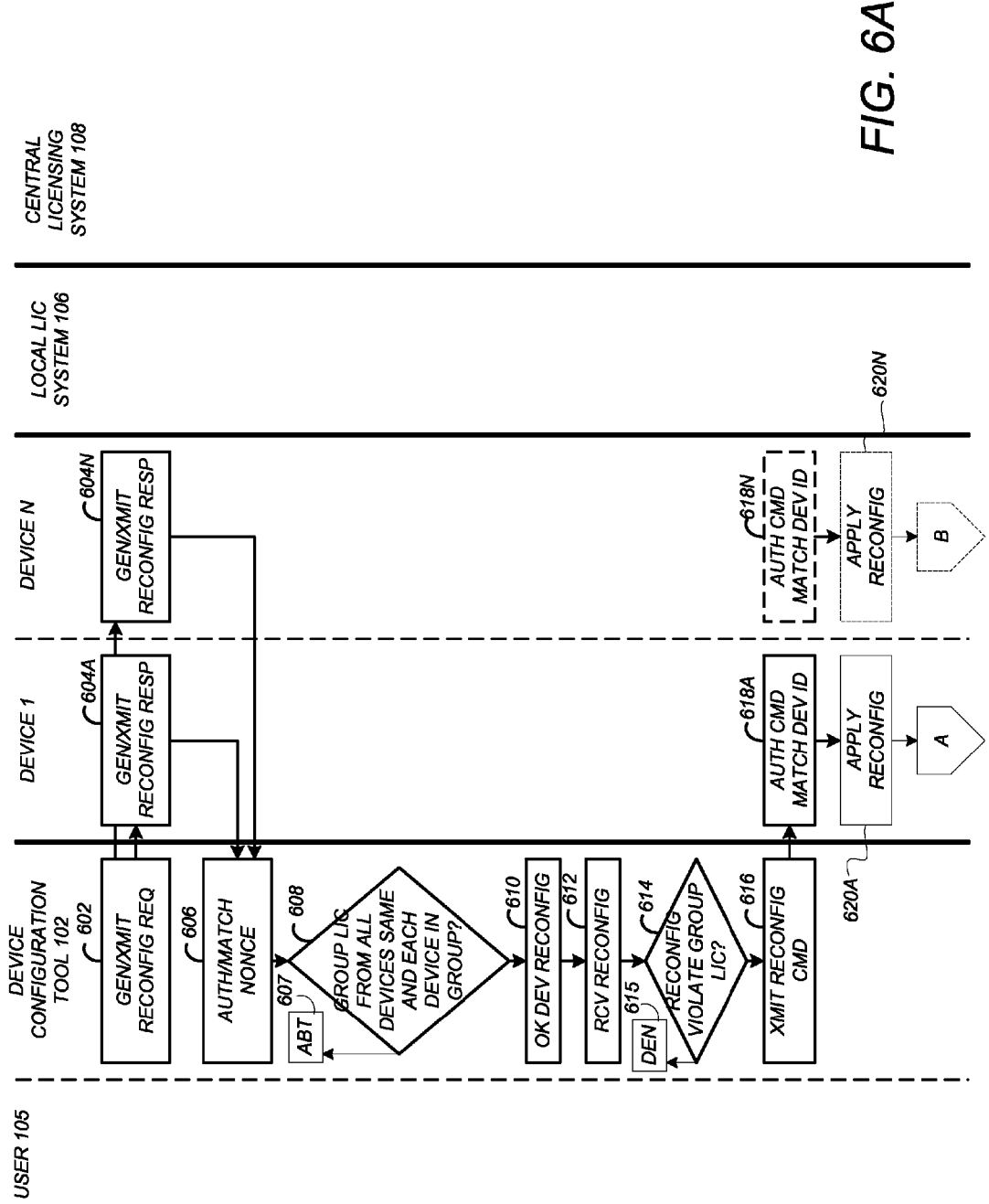

FIGS. 6A and 6B are diagrams illustrating an exemplary process that can be used to change the configuration of one of the devices 104. As shown in block 602, the user 105 uses the device configuration tool 102 to connect to all the devices 104 in the same group 104G. The device configuration tool 102 generates a configuration request and sends the configuration request to every device 104 in the group 104G, as shown in block 602. The configuration request comprises (1) a nonce, and (2) a signature over the entire request signed by a private key only accessible by the device configuration tool 102.

When each of the devices 104 in the group of device 104G receives the configuration request, such devices 104 authenticate the signature, generates a configuration response, and transmits the configuration response to the device configuration tool 102. Each configuration response comprises (1) the device ID of the device 104 transmitting the response (2) the group license stored the device (3) he current configuration of the device, (3) the nonce in the configuration request and (4) a signature over the entire response signed by a private key only accessible by the device 104.

When the device configuration tool 102 receives the configuration response from a device 104, it authenticates the signature and matches the nonce with the nonce transmitted with the configuration request, as shown in block 606. If either operation fails, the configuration response is considered not received After the device configuration tool 102 has received the configuration response from every device 104 in the device group 104G, it checks whether the group licenses in the configuration response are the same and whether each device 104 is in the group, as shown in block 608. If any of the checks fails, the configuration process aborts, as shown in block 607.

After the device configuration tool 102 determines that the group licenses held by all the devices 104 in the group 104G are the same and that the list of devices 104 that responded with that group license matches the list of devices 104 in the group license, a user 105 can make changes to the configuration of any device 104 in the group 104G, as shown in block 610. After any device 104 configuration is changed using the device configuration tool 102, the device configuration tool 102 checks whether any Boolean type feature included in the configuration of any device 104 is also included in the group license, and whether the total capacity of any integer type feature is less than or equal to the value of the same feature in the group license, as shown in block 614. If any of the checks fails, the configuration change is denied, as shown in block 615.

After making sure that any new configuration of the devices in the group does not violate the group license, the device configuration tool sends a configuration application request (or configuration command) to the device(s) 104 that have a configuration change, as shown in block 616. The configuration application request comprises (1) the ID of the device 104 to which the new configuration should be applied, (2) a nonce, (3) the new configuration for the device 104, and (4) a signature over the entire request signed by a private key only accessible by the device configuration tool 102.

When the device 104 receives the configuration command, the device 104 authenticates the signature and matches the device ID in the request with its own, as shown in blocks 618A and 618N. If both are successful, the device 104 applies the new configuration, as shown in blocks 620A and 620N. In blocks 622A and 622N, the device(s) 104 send a configuration command response back to the device configuration tool 102. The configuration command response comprises (1) the ID of the device (2) the nonce in the configuration command, and (3) a signature over the entire response signed by a private key only accessible by the device 104.

When the device configuration tool 102 receives the configuration command response from a device 104, it authenticates the signature and matches the nonce in it with the one in the configuration command for the same device 104, as shown in block 624. As shown in blocks 626-630, when all anticipated configuration command responses have been received and validated (e.g. a configuration command response has been received for each configuration command), the device configuration tool 102 informs the user 105 of the successful configuration process. Otherwise, the tool 102 informs the user of any error.

Periodic or Aperiodic Enforcement

Figure 7:
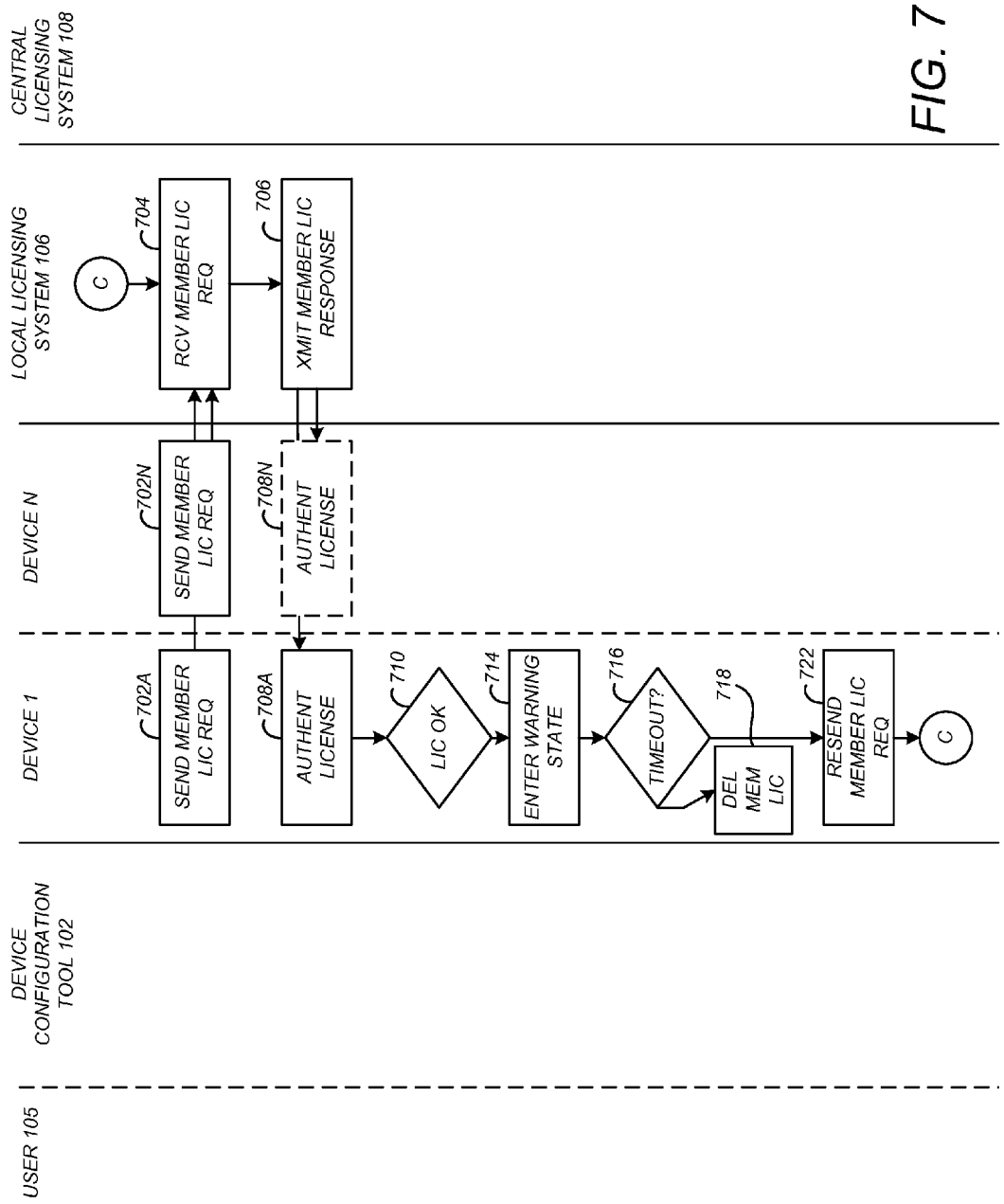
FIG. 7 is a diagram illustrating the enforcement of the group license in the second group licensing paradigm.

FIG. 7 is a diagram illustrating the enforcement of the group license. To prevent a device 104 from being taken out of a device group 104G and still functioning, a device 104 is configured so that it must check in with the local license server 106 that holds the group license for the group 104GA the device 104 belongs to. The time at which the device 104 must perform such check may be periodic (e.g. every day, week, or month), or aperiodic (at time intervals of differing length). The time at which the check must be performed is known to the device(s) 104 who initiate the check, but may also be known to the local licensing system 106, so that if a message requesting the check is not received within an expected amount of time, the local licensing server can reasonably deduce that something is amiss, and suspend the group or member license at issue.

To check in with the local license server 106, a device 104 sends it the same member license request as described block 522 of FIG. 5 as described in the "New Group Initiation" section of Solution 2, as shown in blocks 702A and 702N. The local license server 106 receives the request as shown in block 704, and if the group license is not suspended, replies with the same member license response as shown in block 706 described in the same section above.

The device 104 again authenticates the received license, as shown in block 708, using the same techniques as describe in block 550. If a device 104 does not receive the member license response corresponding to the license request, the device 104 goes into a warning state, as shown in block 714, and the warning state is made aware to the user of the device. If the warning state persists for a pre-defined period of time, the device deletes the license it holds and ceases to function, as shown in blocks 716 and 718. While a device is in the warning state or even not performing its normal function, it still sends out the periodic or aperiodic member license request as shown in block 722, so that after any issue that causes it to fail to receive the membership license response is ameliorated, the device 104 would again receive the membership license response and subsequently exit from the warning state or resume its normal function.

Meanwhile, if the local license server 106, within a pre-defined period of time after the devices 104 are expected to have transmitted a member license request, does not receive a member license request from all the devices 104 in a device group 104 for which it holds a group license, the local license server 106 automatically suspends the group license. For a device group 104G whose license is suspended, the local license server 106 does not send any member license request response. The effect of a group's license being suspended is that any device in the group 104G will eventually cease to function.

In one embodiment, after any issue that causes the persistent absence of member license requests from certain devices 104 in a group 104G is fixed, a user 105 has to manually unsuspend the group's license on the local license server 106. Once a group license is unsuspended, the local license server 106 will resume sending member license responses upon request.

Group Membership Update

When any devices 104 need to be added to or removed from an existing device group 104G, a user 105 uses the local license server 106 to make changes to the group 104G. The user 105 picks the group 104G to change from a list of groups (e.g. 104GA and 104GM) whose group licenses are held by the local license server 106. The local license server 106 makes the list of member devices 104 in the group 104G available to the user 104 to edit using the device configuration tool 102. After the user 105 makes changes to the member list of the group 104G, and optionally to the group feature specification, the local license server 106 creates a group license request, as described in block 508 of FIG. 5 and further described in the "New Group Initiation" section of Solution 2. The group license request for updating group membership contains a new list of member devices 104 in the group.

The group license request is transmitted from the local licensing system 206 to the central licensing system 108, automatically or manually. The central licensing system 108, after authenticating the signature in the request and other validations, generates a new group license, using processes analogous to those of blocks 510-514 of FIG. 5. The new group license comprises (1) the group ID, (2) the device IDs in the group license request, (3) a new sequence number, (4) the feature specification as requested (5) a signature over the entire license signed by a private key accessible only by the central licensing system 108.

The new group license is transmitted to the local license server 106, which after authenticating the signature in the license as shown in block 516 and verifying that the new license's sequence number is higher than that in the existing license, replaces the previously stored group license with the new one.

After the group license on the local license server 106 is updated, a user 105 uses the device configuration tool 102 to perform license initialization for any new member devices 104 and update the license on the devices 104 that remain in the group 104G. The process of license initialization for new member devices is the same as described in blocks 520-532 and the "New Group Initiation" section of Solution 2.

For the devices 104 that remain in the group, the device configuration tool 102 sends them a trigger to cause them to send the local license server 106 a member license request as described in the same section. The member license response from the local license server 106 contains the new group license. A device 104 that receives the new group license replaces the existing group license with the new one after verifying that the new group license's sequence number is higher than that in the existing license.

Defense Against Group Splitting

The central licensing server 108 performs two validations before generating the new group license: the check of the non-empty group rule and the unidirectional membership change rule, as described in the "Group Membership Update" section of Solution 1. With these validations, the group split problem is solved. For example, suppose there is a device group 104G with group ID "G". The group consists of Device A, Device B, Device C and Device D, and uses an instance of the local license server, Server S. A malicious user could create a separate instance of the local license server, Server T, and copy the group license on Server S to Server T. The user then connects Device E, Device F, Device G and Device H to Server T. If the user wants to make the license on Server T to work with the new devices 104 that connect to it, the user would need to remove all exiting members from the group 104G and add the new ones to it. But when the user 105 wants to remove all existing members from the group 104G, the non-empty group rule will not allow the change, as the result would be an empty group.

In the same example, although the user 105 would not be able to create a duplicate group with a set of new devices 104, the user 105 may attempt to move some existing devices 104 to a second group 104G. Suppose the user disconnects Device C and Device D from Server S and connects them to Server T. Now the user 104 has two separate device groups, one with Device A, Device B and Server S—referred to as Subgroup S, and the other with Device C and Device D and Server T—referred to as Subgroup T. At this time, if no membership change is done to the two separate groups, the devices in them will eventually cease to function because of the group license suspension mechanism described in the "Group License Enforcement" section of Solution 2.

However, the user 105 could do membership update for both Subgroup S and Subgroup T, attempting to make the list of devices 104 in either group 104G to match the list of devices 104 in the respective group license, so that both Subgroup S and Subgroup T could be made into legitimate and functioning device groups 104G.

Suppose the user 105 does membership update for Subgroup S first, removing Device C and Device D from Subgroup S and obtaining a new group license that still has group ID "G" but a new device list containing Device A and Device B only. By this time, the central licensing system 108 has updated its membership list of group "G" to having only Device A and Device B. After the new group license is installed on Server S, Subgroup S is made whole, and Device A and Device B are legitimately licensed.

Now the user tries to do membership update for Subgroup T, attempting to remove Device A and Device B from Subgroup T, which still holds the original group license bound to group ID "G". The license request for this membership update would ask the central licensing system 108 to generate a group license for group "G" that should contain members Device C and Device D. From the current member list of group "G" on the central licensing system 108 that contains Device A and Device B to a new member list for the same group 104G that contains Device C and Device D, the changes would be removing Device A and Device B and, at the same time, adding Device C and Device D. Because the unidirectional membership change rule does not allow removing devices from and adding devices to the same group 104G at the same time, the user's second membership update for Subgroup T would not be successful and Subgroup T would not be made functioning, thus defeating the group splitting attempt on group "G".

Solution 3

Solution 3 involves a central licensing system 108, a local license server 106, one or many device configuration tools 102, and a group license format that binds to the local license server 106. The central license server 108 is responsible for group license generation. The device configuration tools 102 are used to configure the devices 104 in a device group 104G. The local license server 106 serves as the anchor of the device group 104G and grants configuration leases to the devices 104 the group 104G. The group license is stored on the local license server 106. License enforcement is performed by the local license server 106 before granting any configuration lease.

Solution 3 is designed for application scenarios where the device group 104G is the entire system of devices 104, the devices are heterogeneous, and the presence of a local license server 106 is financially, technically and legally acceptable. Because the devices 104 in the device group 104G may be of different kinds (e.g. heterogenous), different device configuration tools would be used to configure them.

Local License Server

The local license server 106 is connected to every device 104 in the system 100 over a highly reliable network 110, such as the control network in a video headend, which may be independent of other networks among the devices, such as the video stream network in a video headend. The local license server is typically configured to be highly available.

To prevent a device group 104G from being split into independent and fully functioning groups, the local license server 108 contains a secure component that has a globally unique and non-changeable ID and cannot be virtualized, such as a hardware security module in the form of PCI card or similar device that does not support any of the PCI-SIG I/O virtualization standards. With such a component, the local license server 106 cannot be duplicated nor virtualized into multiple identical local license servers. The unique ID in the secure component serves as the ID of the local license server 106 and is what group licenses are bound to.

A group license comprises (1) the local license server ID, (2) a monotonously increasing sequence number, (3) the feature specification for the group, and (4) a signature over the entire license signed by a private key accessible only by the central licensing system 108.

Because Solution 3 targets the entire system of devices 104, the local license server 106 serves only one group of devices 104. Therefore, there is no need to explicitly manage group 104G membership. Any device 104 added to the system and connected to the local license server 106 becomes a member of the group 104G.

The local license server 106 keeps the feature configuration of each device 104 it last knows about. This information is used in group license enforcement by the local license server 106.

Group License Enforcement

Figure 8:
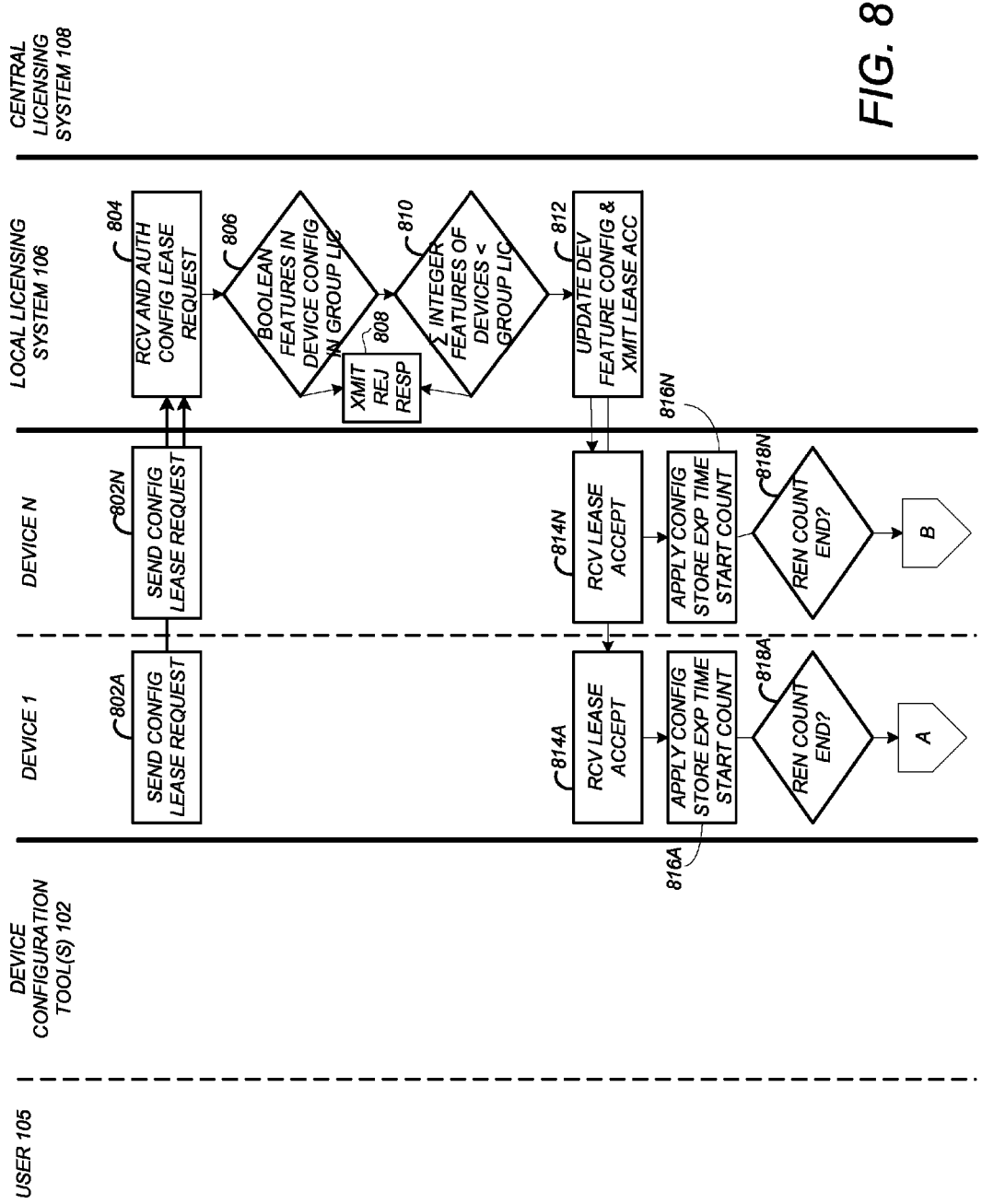
FIG. 8 is a diagram illustrating one embodiment of operations used to perform group license enforcement in a third group licensing paradigm.

FIG. 8 is a diagram illustrating one embodiment of operations used to perform group license enforcement.

Group license enforcement is accomplished through the configuration leasing mechanism. In this mechanism, every device 104 requests configuration lease from the local license server 106, which grants configuration lease after making sure that the group license is not violated.

Every device 104 is configured by a device configuration tool 102. The resulting configuration of a device 102 does not take effect until a configuration lease is obtained from the local license server 106. To obtain a configuration lease, the device 104 sends a configuration request to the local license server 106, as shown in block 802A and 802N. The configuration lease request comprises (1) the device ID of the requesting device 104, (2) a new feature configuration of the requesting device 104, (3) a nonce, and (4) a signature over the entire request signed by a private key only accessible by the device 104.

The local license server 106 receives a configuration lease request and it authenticates the signature, as shown in block 804. The local license server 106 also checks whether all Boolean type features in the device feature configuration are present in the group license, as shown in block 806. If there are Boolean features in the requested device 104 configuration that are not in the group license, the request is rejected, as shown in block 808 and discussed further below. Further, for any integer type feature in the device feature configuration in the configuration lease request, the local license server 106 sums up the value of the feature in the feature configuration of all devices 104 known to the local license server 106, except the requesting device 104. The local license server adds the value of the feature in the lease request to the sum, and then checks if the total exceeds the value of the feature in the group license, as shown in block 810.

If either check fails, the local license server 106 denies the lease request by sending the requesting device 104 a lease rejection response, as shown in block 808. The lease rejection response comprises (1) the device ID in the lease request, (2) the nonce in the lease request (3) a feature specification that contains (a) the Boolean type features in the group license, and (b) the unused capacity of each integer type feature in the group license, and (4) a signature over the entire response signed by a private key only accessible by the local license server.

The use of nonce ensures that a response can be paired with the request with the same nonce and prevents from a response being replayed. The device ID in a response binds it to the requesting device 104, thus ensuring only the requesting device 104 can use the response. The feature specification in the response lets the device 104 know what are still available so that a new configuration lease request would not violate the group license. The signature makes the license the response tamper-proof.

When the requesting device 104 receives a lease rejection, it abandons the pending configuration change.

If both checks pass, the local license server updates the feature configuration on record for the request device, and grants the lease by sending the requesting device a lease acceptance response, as shown in block 812. The lease acceptance response comprises (1) the device ID of the device 104 that made the lease request (2) the nonce in the lease request, (3) the feature configuration in the lease request, (4) a lease expiration time set as the time of the request plus a pre-defined lease period, and (5) a signature over the entire lease acceptance signed by a private key only accessible by the local license server.

When the requesting device 104 receives the lease acceptance response, it authenticates the signature, applies the requested feature configuration, records the lease expiration time, and starts the pre-defined lease renewal countdown, as shown in blocks 814A-816N. The lease period is longer than the lease renewal countdown, allowing the requesting device 104 to function for a certain period of time in case a lease renewal cannot be obtained normally.

Configuration Lease Renewal

Figure 9:
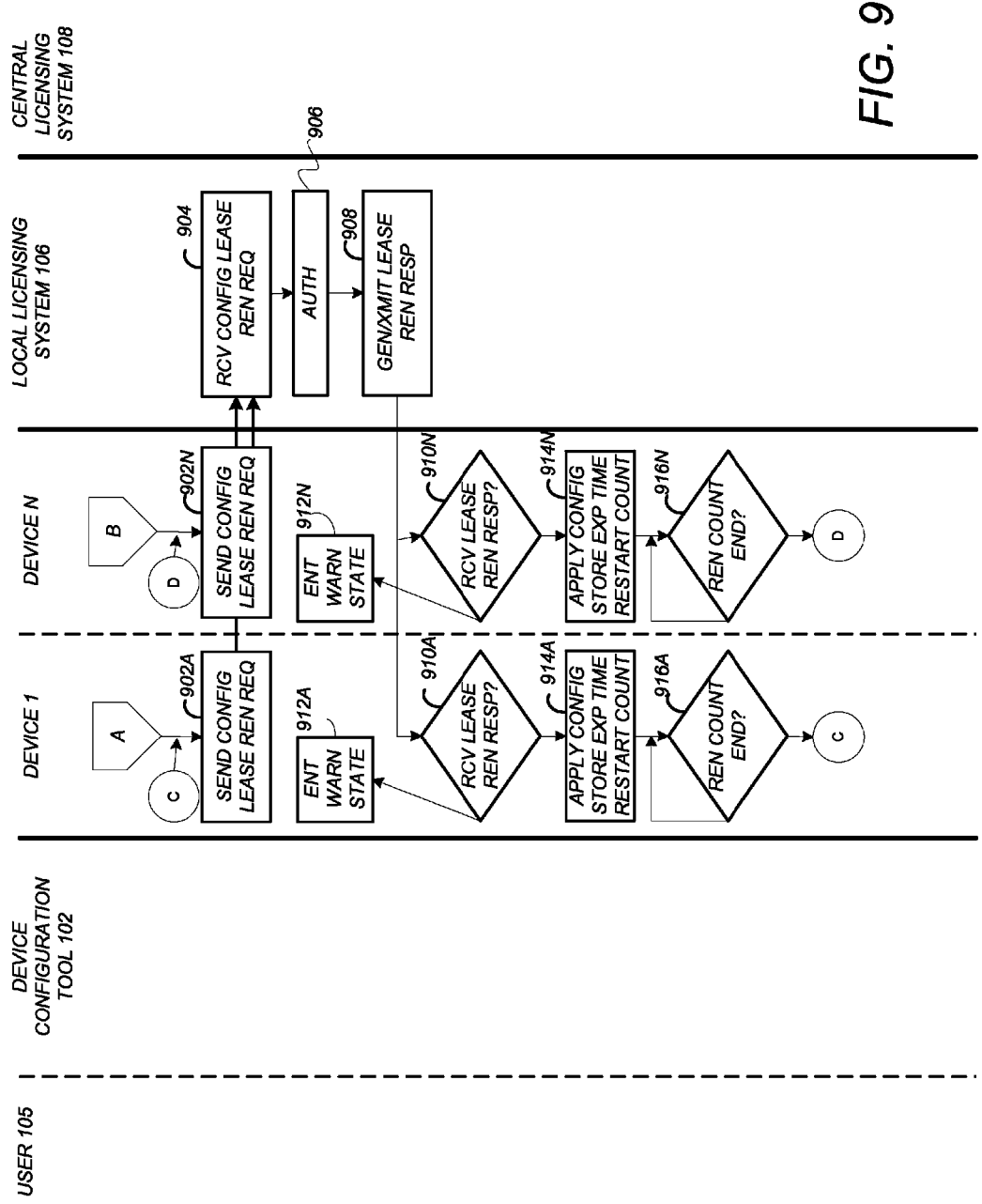
FIG. 9 is a diagram illustrating exemplary operations performed for renewing the configuration lease in the third group licensing paradigm.

FIG. 9 is a diagram illustrating exemplary operations performed for renewing the configuration lease. To prevent a device 104 from being taken out of the group 104G and continuing to function as currently configured, the existing configuration lease on every device 104 needs to be renewed by the local license server 106 on an occasional (periodic or aperiodic) basis. When the lease renewal countdown of blocks 818A and 818N ends, a device 104 sends the local license server a lease renewal request, as shown in blocks 902A and 902N. The lease renewal request comprises (1) the device ID of the requesting device 104, (2) a nonce, (3) a signature over the entire request signed by a private key only accessible by the device 104.

The local license server 106 receives the lease renewal request, as shown in block 904. It authenticates the signature as shown in block 906, and if authentication is successful, simply returns a lease renewal response, as shown in block 908. The lease renewal response comprises: (1) the device ID in the renewal request, (2) the nonce in the renewal request, (3) an expiration time set as the requesting time plus the pre-defined lease period and (4) a signature over the entire response signed by a private key only accessible by the local license server.

If the requesting device 104 receives the lease renewal response, it authenticates the signature, records the new configuration lease expiration time, and resets the lease renewal countdown, as shown in blocks 910A-914N.

If the requesting device 104 does not receive a lease renewal response, the configuration lease on a device expires, the device goes into a warning state, as shown in blocks 912A and 912N. The warning state is made known to the operator of the device. If the device stays in the warning state for a certain period of time, the device ceases to function.

Configuration Lease Release

Figure 10:
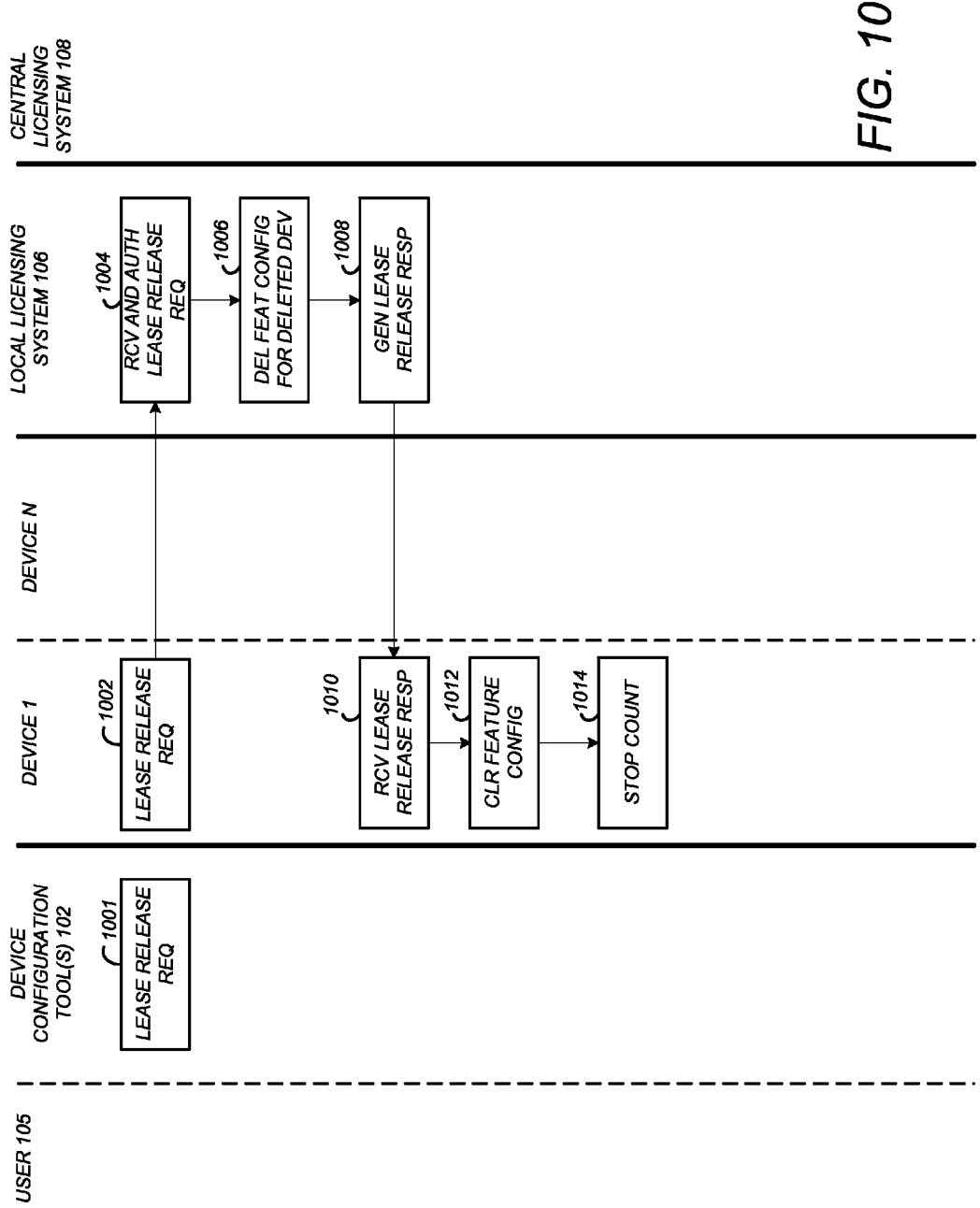
FIG. 10 is a diagram illustrating operations that can be used to remove a device from the group in the third group licensing paradigm.

FIG. 10 is a diagram illustrating operations that can be used to remove a device from the group in the third group licensing paradigm. When a device 104 needs to be removed from the group 104G, a user 105 uses the device configuration tool 102 for the device 102 to initiate configuration lease release, as shown in block 1001. The device 104 sends a lease release request to the local license server 106, as shown in block 1002. The release request comprises (1) the device ID of the requesting device 104, (2) a nonce, and (3) a signature over the entire request signed by a private key only accessible by the device 104.

The local license server receives the lease release request, as shown in block 1004. Upon authenticating the signature, it also deletes the feature configuration on record for the request device, and returns a lease release response, as shown in blocks 1006 and 1008. The lease release response comprises (1) the device ID in the release request, (2) the nonce in the release request, and (3) a signature over the entire response signed by a private key only accessible by the local license server 106.

The requesting device 104 receives the release response, and upon authenticating the signature, clears out its feature configuration and configuration lease expiration time, and stops the lease renewal countdown, as shown in blocks 1010-1014.

Configuration Lease Cancellation

A device 104 may occasionally stop working and need to be removed from the device group 204G. To remove the device 104 from the group 104G, its configuration lease must be released. But because a configuration lease release cannot be initiated from the defunct device 104, its configuration lease can only be cancelled on the local license server 106. In this case, a user 105 uses the user interface of the local license server 106 to identify the feature configuration record of the defunct device 104 and deletes it.

Hardware Environment

Figure 11:
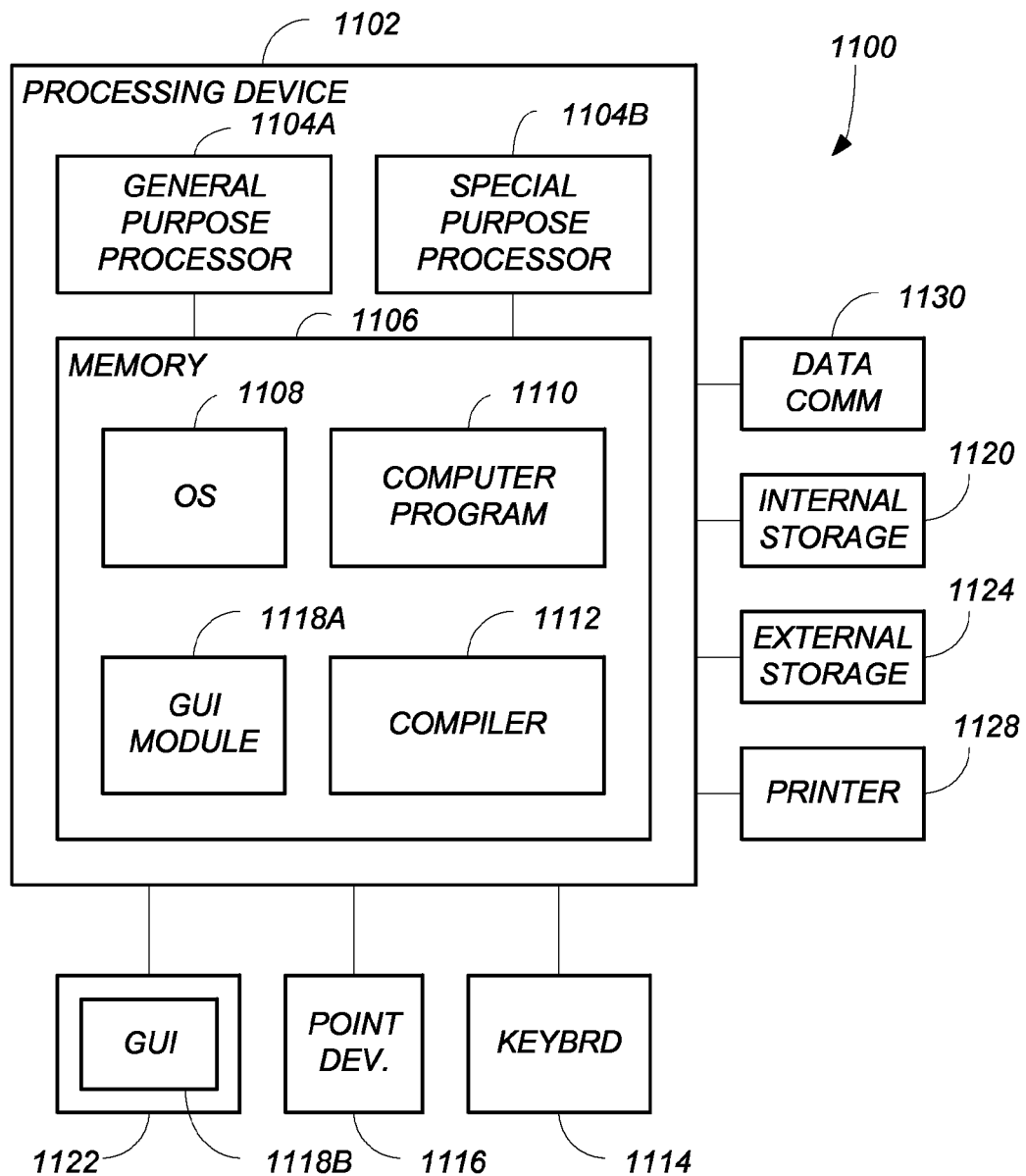
FIG. 11 is a diagram illustrating an exemplary computer system that could be used to implement elements of the present invention.

FIG. 11 is a diagram illustrating an exemplary computer system 1100 that could be used to implement elements of the present invention, including the device configuration tool 102, devices 104, local licensing server 106 and central licensing server 108. The computer system 1100 includes a processing device such as a computer 1102, which comprises a general purpose hardware processor 1104A and/or a special purpose hardware processor 1104B (hereinafter alternatively collectively referred to as processor 1104) and a memory 1106, such as random access memory (RAM). The computer 1102 may be coupled to other devices, including input/output (I/O) devices such as a keyboard 1114, a mouse device 1116 and a printer 1128.

In one embodiment, the computer 1102 operates by the general purpose processor 1104A performing instructions defined by the computer program 1110 under control of an operating system 1108. The computer program 1110 and/or the operating system 1108 may be stored in the memory 1106 and may interface with the user and/or other devices to accept input and commands and, based on such input and commands and the instructions defined by the computer program 1110 and operating system 1108 to provide output and results.

Output/results may be presented on the display 1122 or provided to another device for presentation or further processing or action. In one embodiment, the display 1122 comprises a liquid crystal display (LCD) having a plurality of separately addressable pixels formed by liquid crystals. Each pixel of the display 1122 changes to an opaque or translucent state to form a part of the image on the display in response to the data or information generated by the processor 1104 from the application of the instructions of the computer program 1110 and/or operating system 1108 to the input and commands. Other display 1122 types also include picture elements that change state in order to create the image presented on the display 1122. The image may be provided through a graphical user interface (GUI) module 1118A. Although the GUI module 1118A is depicted as a separate module, the instructions performing the GUI functions can be resident or distributed in the operating system 1108, the computer program 1110, or implemented with special purpose memory and processors.

Some or all of the operations performed by the computer 1102 according to the computer program 1110 instructions may be implemented in a special purpose processor 1104B. In this embodiment, some or all of the computer program 1110 instructions may be implemented via firmware instructions stored in a read only memory (ROM), a programmable read only memory (PROM) or flash memory within the special purpose processor 1104B or in memory 1106. The special purpose processor 1104B may also be hardwired through circuit design to perform some or all of the operations to implement the present invention. Further, the special purpose processor 1104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1102 may also implement a compiler 1112 which allows an application program 1110 written in a programming language such as COBOL, C++, FORTRAN, or other language to be translated into processor 1104 readable code. After completion, the application or computer program 1110 accesses and manipulates data accepted from I/O devices and stored in the memory 1106 of the computer 1102 using the relationships and logic that was generated using the compiler 1112.

The computer 1102 also optionally comprises an external communication device such as a modem, satellite link, Ethernet card, or other device for accepting input from and providing output to other computers.

In one embodiment, instructions implementing the operating system 1108, the computer program 1110, and/or the compiler 1112 are tangibly embodied in a computer-readable medium, e.g., data storage device, which could include an internal storage device 1120 or external storage device 1124 in the form of one or more fixed or removable data storage devices, such as a zip drive, floppy disc drive, hard drive, CD-ROM drive, tape drive, or a flash drive. Further, the operating system 1108 and the computer program 1110 are comprised of computer program instructions which, when accessed, read and executed by the computer 1102, causes the computer 1102 to perform the steps necessary to implement and/or use the present invention or to load the program of instructions into a memory, thus creating a special purpose data structure causing the computer to operate as a specially programmed computer executing the method steps described herein. Computer program 1110 and/or operating instructions may also be tangibly embodied in memory 1106 and/or data communications devices 1130, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1102.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of licensing features for one or more groups of devices selected from one or more of a plurality of devices, the method comprising:
   receiving a first group license request for a group license associated with a first group of devices, the first group license request comprising:
      a device identification (ID) for each of the devices in the first group of devices; and
      first group requested features;

determining when the first group license request complies with a validation rule, wherein the validation rule requires that the first group license request includes a device ID of at least one of the devices in the first group of devices, and none of the devices in the first group of devices are members of another group of devices;

when the first group license request complies with the validation rule, generating a first group license according to the first group license request, the first group license comprising:
  a globally unique first group ID;
  a member list comprising the device ID for each of the devices in the first group;
  a first monotonically increasing sequence number;
  a first group license feature specification comprising the first group requested features; and securely transmitting the generated first group license to each device in the first group of devices;

wherein each device in the first group devices, determines when the device ID of the each device is included in the member list, and when the device ID of the each device is included in the member list, stores the first group license on the each device in the first group of devices;

receiving a second group license request for a second group license associated with a second group of devices, the second group license request comprising:
  a group ID for the second group of devices;
  a device ID for each of the devices in the second group of devices; and
  second group requested features;

wherein at least one of the second group of devices and the second group requested features is different than the respective first group of devices and the first group of requested features;

determining when the second group license request complies with the validation rule, wherein the validation rule further comprises that the second group of devices either adds a device to the first group of devices or removes a device from the first group of devices, but does not both add a device to the first group of devices and remove another device from the first group of devices;

when the second group license complies with the validation rule, validating the second group license request;

when the second group license request is valid, generating a second group license according to the second group license request the second group license comprising:
  globally unique second group ID;
  a second member list comprising the device ID for each of the devices in the second group;
  a second sequence number higher than the first sequence number;

securely transmitting the generated second group license to each device of the second group of devices;

wherein each device in the second group of devices determines:
  when the group ID of the second group license is the same as the group ID of the first group license;
  when the second sequence number is higher than the first sequence number; and
  when the device ID of each device is included in the second member list;

and wherein each device stores the second group license in the each device in the second group of devices in response to determining:
  the second group ID of the second group license is the same as the first group ID of the first group license;
  the second sequence number is higher than the first sequence number;
  and the device ID of the each device in the second group of devices is included in the second member list.

2. The method of claim 1, wherein the first group of devices associated with the first group license are interconnected with each other are homogenous.

3. The method of claim 1, wherein:
  the first group license request and the first group license include a number of Boolean group features that each device in the first group of devices is to enable, and a number of integer type group features each of which has a desired group-wide capacity to be reached by the first group of devices when each device in the first group of devices enables a device-wide capacity and a total of the device-wide capacities enabled on the devices in the first group of devices equals the desired group-wide capacity.

4. A method of licensing features for one or more groups of devices selected from one or more of a plurality of devices, the method comprising:
  receiving a first group license request for a group license associated with a first group of devices, the first group license request comprising:
    a device identification (ID) for each of the devices in the first group of devices: and
    first group requested features:
  determining when the first group license request complies with a validation rule, wherein the validation rule requires that the first group license request includes a device ID of at least one of the devices in the first group of devices, and none of the devices in the first group of devices are members of another group of devices:
  when the first group license request complies with the validation rule, generating a first group license according to the first group license request, the first group license comprising:
    a globally unique first group ID;
    a member list comprising the device ID for each of the devices in the first group;
    a first monotonically increasing sequence number;
    a first group license feature specification comprising the first group requested features;
  securely transmitting the generated first group license to each device in the first group of devices;
  wherein each device in the first group of devices determines when the device ID of the each device is included in the member list, and when the device ID of the each device is included in the member list, stores the group license on the each device in the first group of devices;
  wherein:
    the first group requested features include a group Boolean feature and a group integer feature; and
    each of the devices in the first group of devices comprises a device Boolean feature and a device integer feature;
  transmitting a first message from each device in the first group of devices to the other devices in the first group of devices, the message comprising:
    the device ID of the each device transmitting the message;
    the group ID received in the first group license;
    current feature configuration of the each device;
  receiving one or more second messages transmitted by each other device in the first group of devices, each of the one or more second messages comprising:

the device ID of the device transmitting the respective second message;

the group ID received of the first group license received by each other device in the first group of devices;

the feature configuration of each other device in the first group of devices;

performing a membership check to determine when the received member list of the group license matches the device IDs of the second messages received from the other devices in the first group of devices; and performing a feature check, comprising:

performing a Boolean feature check to determine when each Boolean feature of each device is included as a group Boolean feature of the first group license; and performing an integer feature check to determine when the sum of the integer features of all of the devices in the first group of devices is no greater than the associated group integer feature.

5. The method of claim 4, further comprising: when the received member list of the group license matches the device IDs of the second messages received from the other devices in the first group of devices, each Boolean feature of each device is included as a group Boolean feature of the first group license, and the sum of the integer features of all of the devices in the first group of devices is no greater than the associated group integer feature, enabling device features having a configuration complying with the group license and disabling the device features having a configuration not complying with the group license.

6. A method of licensing features for one or more device groups selected from a plurality of devices in a network, the method comprising:

transmitting, from a local licensor to each device in a first group of the plurality of devices, a device identification (ID) request, the first group comprising one or more of the plurality of devices;

receiving, in the local licensor, a device ID for each of the devices in the first group of devices, and requested first group features;

generating a first group license request, comprising:
the device ID for each of the devices in the first group of devices; and
the requested first group features;

transmitting the first group license request to a central licensor;

receiving a first group license from the central licensor only when, as determined by the central licensor, the first group license request complies with a validation rule, wherein the validation rule requires that the first group license request includes at a device ID of at least one of the plurality of devices and that none of the devices in the first group of devices are in another device group, and wherein the first group license comprises:
a globally unique first group license ID;
a member list comprising the device ID for each of the devices in the first group; a first sequence number; and
a first group license feature specification comprising the requested first group features;

storing the group license in the local licensor;

receiving a member license request from at least one device in the first group of devices, the member license request comprising:
the device ID of the at least one device transmitting the member license request;

determining, in the local licensor, when the at least one device transmitting the member license request is a member of the first group of devices;

when the at least one device transmitting the member license request is a member of the first group of devices, generating a member license, the member license comprising the first group license;

securely transmitting the stored group license to the at least one device, for storage on the at least one device, wherein:
the first requested group features include a group Boolean feature and a group integer feature: and
each of the devices in the first requested group features comprises a device Boolean feature and a device integer feature:

transmitting a configuration request to all of the devices in the first group of devices;

receiving a configuration response from the devices in the first group of devices, the configuration response comprising:
the device ID of the device in the first group of devices transmitting the configuration response;
the group license stored by the device:

determining when each group license received from each of the devices in the first group of devices is the same as the group license received from the other of the devices in the first group of devices and when a group license is received from each member of the first group of devices;

receiving a configuration of at least one device of the first group of devices;

only when each group license received from each of the devices in the first group of devices is the same as the group license received from the other of the devices in the first group of devices and when a group license is received from each member of the first group of devices, determining when the configuration of the at least one device of the first group of devices complies with the group license, comprising:
performing a feature check, comprising:
performing a Boolean feature check to determine when, after configuration of the at least one of the first group of devices, each Boolean feature of each device is included as a group Boolean feature of the first group license;
performing an integer feature check to determine when, after configuration of the at least one of the first group of devices, the sum of the integer features of all of the devices in the first group of devices is no greater than the associated the group integer feature; and determining that the reconfiguration of the at least one device of the first group of devices complies with the group license when, after reconfiguration of the at least one of the first group of devices, each Boolean feature of each device is included as a group Boolean feature of the first group license, and the sum of the integer features of all of the devices in the first group of devices is no greater than the associated the group integer feature;

only when the reconfiguration of the at least one of the first group of devices complies with the group license, transmitting a reconfiguration command to the at least one of the first group of devices, the reconfiguration command comprising:
the device ID of the at least one of the first group of devices;

the reconfiguration of the at least one device of the first group of devices;

receiving a reconfiguration command response from the at least one of the first group of devices.

7. The method of claim 6, wherein receiving, in the local licensor, a device ID for each of the devices in the first group of devices comprises:

transmitting a request for a device ID to each of the devices in the first group of devices; and securely receiving a response to the request for the device ID, the response comprising the device ID for each of the devices in the first group of devices.

8. The method of claim 6, wherein receiving the first group license comprises:

receiving, the first group license request in a central licensor;

determining when the first group licensing request complies with the validation rule; and when the first group licensing request complies with the validation rule, generating the first group license and transmitting the first group license from the central licensor.

9. The method of claim 6, wherein:

the first group license request and the first group license include a number of Boolean group features that each device in the first group of devices is to enable, and a number of integer type group features each of which has a desired group-wide capacity to be reached by the first group of devices when each device in the first group of devices enables a device-wide capacity and a total of the device-wide capacities enabled on the devices in the first group of devices equals the desired group-wide capacity.

10. The method of claim 6, further comprising:

receiving a member license request from each of the devices in the first group in the local licensor, each member license request comprising a device ID of the device transmitting the member license request; and transmitting the member license to each one of the devices in the first group.

11. The method of claim 10, wherein each device in the first group of devices is mandated to occasionally transmit the member license request to the local license server and continue to function only when the device receives the first member license response corresponding to the first members license request and verifies that the member list in the first member license response contains the device's ID.

12. The method of claim 6, wherein the first local licensor suspends the group license if the local license server does not receive a member license request from each device in the first group of devices, when not receiving the first member license request from all the devices in the first device group within a period of time, does not send the first member license response to any of the devices in the first device group in response to the first member license request from them, until the first local license server is instructed to resume sending the first member license response to the devices in the first device group.

* * * * *